United States Patent [19]

Nakajima

[11] Patent Number: 4,648,380
[45] Date of Patent: Mar. 10, 1987

[54] HEATING APPARATUS USING LIQUEFIED GAS

[75] Inventor: Masahiko Nakajima, Tokyo, Japan

[73] Assignee: Nakajima Ookosho Company Ltd., Tokyo, Japan

[21] Appl. No.: 758,804

[22] Filed: Jul. 25, 1985

[30] Foreign Application Priority Data

Jul. 31, 1984 [JP] Japan .................................. 59-160320

[51] Int. Cl.⁴ ............................................... B23K 3/02
[52] U.S. Cl. .................................... 126/414; 126/237; 126/231
[58] Field of Search ................ 126/403, 406, 413, 414, 126/237, 238, 231–234; 431/344

[56] References Cited

U.S. PATENT DOCUMENTS 4,119,088 10/1978 Sim ........................................ 126/413
4,133,301 1/1979 Fujiwara ............................... 431/344

Primary Examiner—Carroll B. Dority, Jr.
Attorney, Agent, or Firm—Cushman, Darby & Cushman

[57] ABSTRACT

A heating apparatus using liquefied gas comprises a control valve which controls the gas flow rate by the rotating operation of a flow rate control member and which is rendered open to discharge a gas under flow rate control from the top end of a cylindrical valve body when the body is caused to slide, and a control valve operating mechanism mounted to the control valve which causes the valve body to slide when the mechanism is displaced toward axially, as well as causes the flow rate control member to rotate when the mechanism is rotated circumferentially.

7 Claims, 12 Drawing Figures

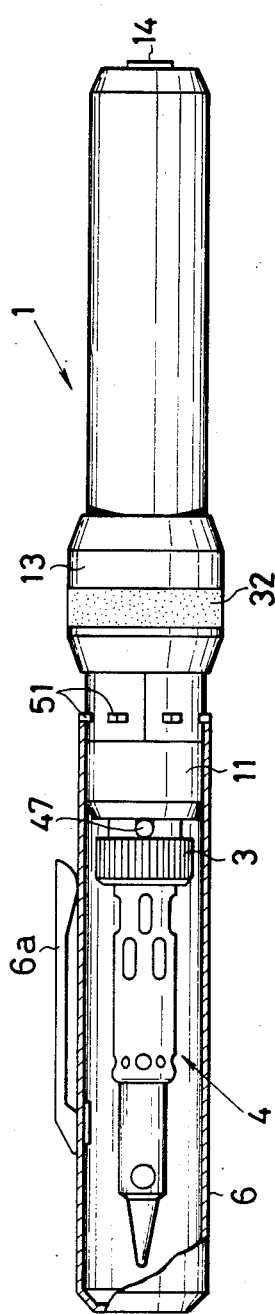
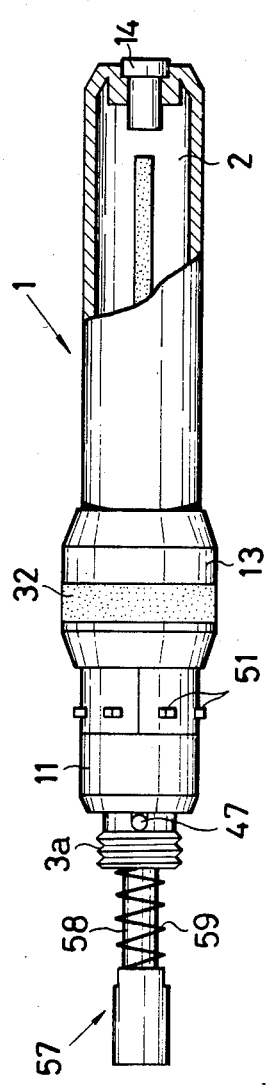
FIG.1
FIG.2

HEATING APPARATUS USING LIQUEFIED GAS

BACKGROUND OF THE INVENTION

1. Field of the Invention

This invention concerns a heating apparatus utilizing the combustion heat of liquefied gas and, particularly, it relates to an improvement in the gas flow rate control mechanism used for the heating apparatus of the above-described type.

2. Description of the Prior Art

In the conventional heating apparatus using liquefied gas of the type as described above, a needle valve is disposed at the exit of a gas reservoir containing liquefied gas sealed therein and the degree of opening in the valve is adjusted for the ON-OFF control, as well as flow rate control as proposed, for example, in Japanese Patent Publications Nos. 6033 and 46783/1980.

However, since a long gas flow channel is present between the needle valve and the combustion section, gas combustion can not be interrupted directly even after the needle valve has fully been closed. In this case, an operator often mistakes such a state as if the valve were not yet closed fully and further turns the valve forcively in the valve closing direction, which may possibly damage the valve.

Further, since the needle valve is adapted to be closed or opened by the contact between metal members, metal powder caused by the frictional contact tends to clog the nozzle.

In order to overcome such drawbacks, a control valve comprising a flow rate control valve and an ON-OFF valve combined to each other has also been used to perform the flow rate control and the valve ON-OFF control separately, for example, as disclosed in U.S. patent application Ser. No. 620,326 filed June 12, 1984, now U.S. Pat. No. 4,552,124, by the present inventor. However, in this control valve, since the flow rate control has to be done separately after the valve ON-OFF control, the procedures are troublesome and time consuming.

OBJECT OF THE INVENTION

This invention has been made in view of the foregoings and it is an object thereof to provide a heating apparatus using liquefied gas capable of valve ON-OFF control and flow rate control by a step continuous of operation and attaining an easier thermal power control.

SUMMARY OF THE INVENTION

The above-described object can be attained in accordance with this invention by a heating apparatus using liquefied gas comprising:

(a) a control valve which controls the gas flow rate by the rotating operation of a flow rate control member and which is rendered open to discharge a gas under flow rate control from the top end of a cylindrical valve body when the valve body having a top end being projected from the flow rate control member is caused to slide toward the top end against the resiliency of a spring, (b) a gas reservoir for supplying a gas to the control valve, (c) a gas mixture generation means which jets out the gas discharged from the top end of the valve body by way of a restriction portion and attracting an external air by the ejector effect of the jetted gas to generate a gas mixture of the gas and the air, (d) a combustion section for the combustion of the gas mixture, (e) a control valve operating mechanism mounted to the control valve which causes the valve body to slide toward the top end when the mechanism is displaced toward the top end or to the axial center, as well as causes the flow rate control member to rotate when the mechanism is rotated around the axis of the control valve.

BRIEF DESCRIPTION OF THE DRAWINGS

These and other objects as well as advantageous features of this invention will be made clearer by reading the detailed descriptions for the preferred embodiments of this invention referring to the accompanying drawings, wherein FIG. 1 is a side elevational view, partially in cross section, of one embodiment according to this invention, FIG. 2 is a side elevational view, partially in cross section, of the embodiment shown in FIG. 1 with several of the parts being removed.

DESCRIPTION OF ILLUSTRATED EMBODIMENTS

Figure 3:
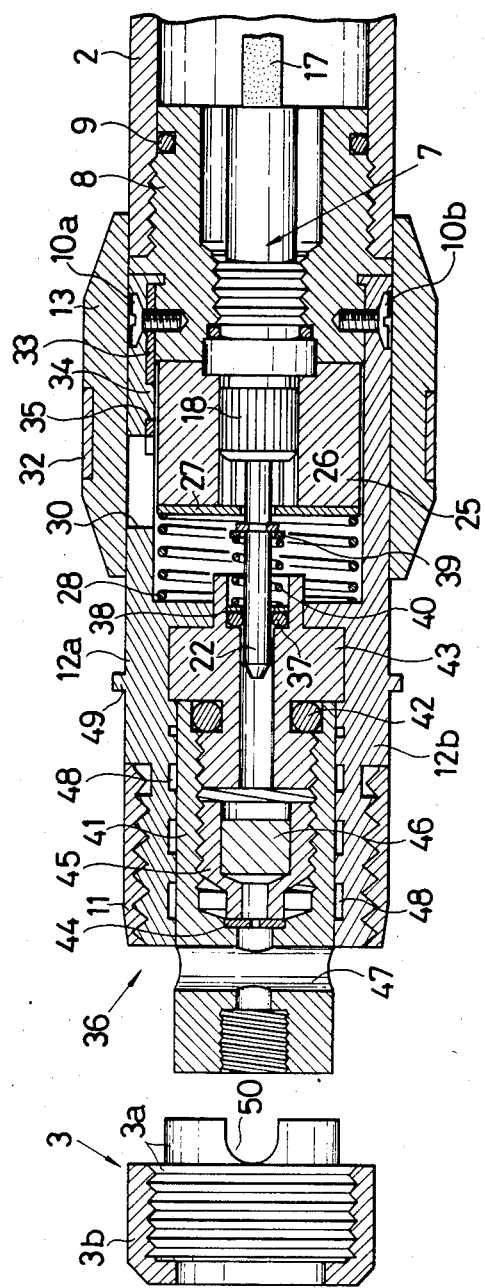
FIG. 3 is a cross sectional view showing the details for the inside of a grip portion.

This invention will be described by way of non-limitative embodiments thereof illustrated in the drawings.

FIG. 1 and FIG. 2 show one embodiment of this invention applied to a soldering iron using liquefied gas, in which a hollow grip 1 forming a housing incorporates therein a gas reservoir 2 for liquefied gas. An iron tip member 4 is replaceably mounted by way of a mounting mechanism 3 to the top end of the grip 1 and the iron tip member 4 incorporates to the inside thereof a combustion mechanism which is screw-coupled to the top end of the grip 1. Further, a cap 6 having a retainer clip 6a is mounted at the top end of the grip 1 as shown in FIG. 1, so that the soldering iron can be retained safely to a worker's pocket or placed in a tool box even directly after the use.

As shown in FIG. 1 through FIG. 3, particularly in FIG. 3, the grip 1 comprises a control valve holder 8 in which a control valve 7 having both ON-OFF and flow rate control functions is screw-engaged coaxially in a gas tight manner, the gas reservoir 2 as described above that is screw-coupled to the rear end of the control valve holder 8 by means of an O-ring 9, and vertically bisected upper half top end member 12a and a lower half top end member 12b that are secured at their respective rear ends to the top end of the control valve holder 8 by means of small screws 10a and 10b and integrated with each other at their respective top ends by a connection nut 11. Over the outer circumference at the rear end of both of the top end members 12a and 12b, a cylindrical control member 13 that controls the control valve 7 is mounted slidably both in the axial and the circumferential directions. A gas injection valve 14 is attached at the rear end of the gas reservoir 2.

Figure 4:
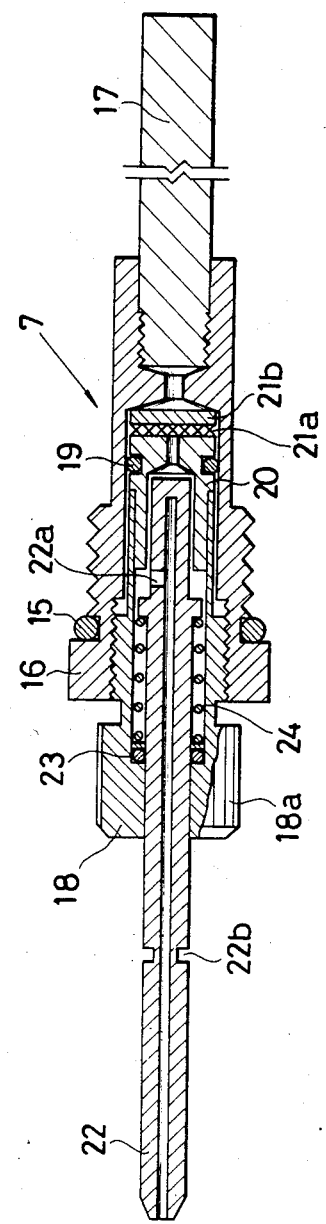
FIG. 4 is a cross sectional view showing the inner structure of a control valve.

As shown in FIG. 4, the control valve 7 has a valve casing 16 threadingly secured in a gas tight manner to the control valve holder 8 by means of an O-ring 15, and a porous hose 17 is screwed into the base end of the valve casing 16 and extended to the inside of the gas reservoir 2 for introducing the liquefied gas from the gas reservoir 2 into the valve casing 16. The porous hose 17 is made, for example, of synthetic resins of continuous cellular foam structure, braided fabrics of synthetic resin fibers or the likes.

Also, as shown in FIG. 4, a flow rate control member 18 having a knurled portion 18a around the outer circumference at the top end thereof is screw-coupled from the top end to the inside of the valve casing 16, the axial movement of which can be adjusted by the rotation of the threads. A cylindrical retainer 20 is mounted to the base end of the flow rate control member 18 while being sealed in a plane-to-plane contact to the flow rate control member 18 and slidably sealed to the valve casing 16 by means of an O-ring 19. Further, gas restriction discs 21a, 21b are put between the face at the base end of the retainer 20 and the corresponding inner face of the valve casing 16.

The gas restriction disc 21a is made of material which is relatively soft and has a plurality of fine pore channels, while the gas restriction disc 21b is made of material which is relatively rigid and has less fine pore channels, so that the liquefied gas introduced by way of the porous hose 17 to the inside of the valve casing 16 may be evaporized during passage through both of the gas restriction discs 21a and 21b. When the flow rate control member 18 is rotated for adjusting the urging force of the retainer 20 to both of the gas restriction discs 21a and 21b, the gas restriction discs (mainly, the disc 21a) are compressed to change the porosity and the amount of the gas passed therethrough is controlled in proportion to the threading advance of the flow control member 18.

As shown in FIG. 4, to the inside of the flow rate control member 18 and the retainer 20 having thus been constituted, a cylindrical valve body 22 closed at the base end is incorporated axially slidably while being protruded at the top end thereof. The valve body 22 is sealed against the flow rate control member 18 by means of an O-ring 23 and normally urged resiliently toward the base end by means of a spring 24. In this normal state, as shown in FIG. 4, the base end of the valve body 22 is in contact with the inner circumferential surface of the retainer 20 to provide a gas tight sealing, so that the gas passing through the gas restriction discs 21a and 22b are not supplied to the inside of the valve body 22 by way of a communication hole 22a formed to the valve body 22. On the other hand, when the valve body 22 is caused to slide toward the top end against the resiliency of the spring 24, the sealing contact between the valve body 22 and the retainer 20 is released, allowing the gas from the gas restriction discs 21a and 21b to be introduced through the communication hole 22a to the inside of the valve body 22.

As shown in FIG. 3, a cylindrical actuator 25 is disposed over the outer circumference of the knurled portion 18a on the flow rate control member 18 of the control valve 7, and the actuator 25 slides axially to perform ON-OFF control for the control valve 7 and rotates circumferentially around the axis to perform flow rate control.

Figure 5:
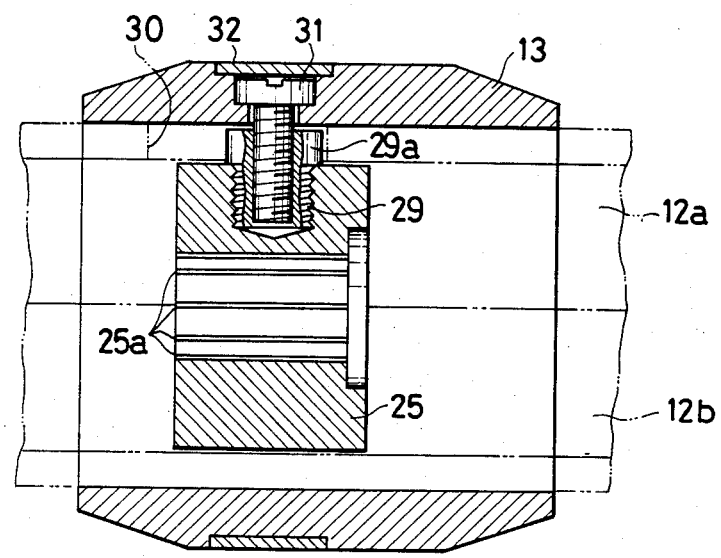
FIG. 5 is a cross sectional view showing the connected state between the control member and the actuation member.

As shown in FIG. 3 and FIG. 5, the actuator 25 has a plurality of ridges 25a formed at the inner circumferential surface thereof that engage the appropriate recesses of the knurled portion 18a on the flow rate control member 18, by which the actuator 25 is connected to the flow control member 18 slidably in the axial movement and secured integrally for the circumferential movement. A disc 27 is disposed to the top end of the actuator 25, so that it abuts against an E-ring 26 mounted to the reduced-diameter portions 22b (refer to FIG. 4) of the valve body 22 as shown in FIG. 3 to cause the valve body 22 to slide toward the top end. The disc 27 is normally urged resiliently toward the base end together with the actuator 25 by a spring 28 incorporated to the inside of both of the top end members 12a and 12b.

Further, as shown in FIG. 5, a guide screw 29 having female threads at its inner circumference is screw-coupled to the outer circumferential surface of the actuator 25 and the disc-like head 29a of the guide screw 29 that projects to the outer surface of the actuator 25 is normally engaged into a guide hole 30 formed in the upper half top end member 12a. Further, a connection bolt 31 is screw-engaged with the female threads formed at the inner circumference of the guide screw 29 for connecting the control member 13 with the actuator 25, by which both of the members 12 and 25 are interlocked completely. Further, an anti-slip ring 32, for example, made of rubber is secured to the outer circumferential surface of the control member 13 for the prevention of the slip.

Figure 6:
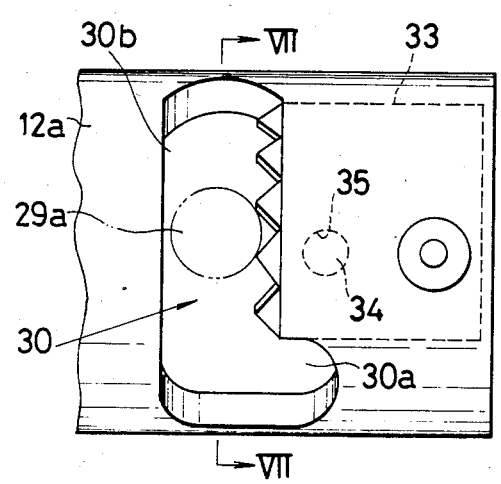
FIG. 6 is an explanatory view showing the relationship between the guide hole and the positioning plate disposed on an upper half top end member.
Figure 7:
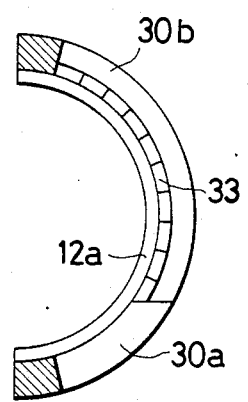
FIG. 7 is a cross sectional view taken along line VII—VII in FIG. 6.

As shown in FIG. 6 and FIG. 7, the guide hole 30 generally has an L-shaped configuration comprising an axial aperture 30a for guiding the axial sliding of he control member 13 and a circumferential aperture 30b for guiding the circumferential sliding of the member 13. Accordingly, when the control member 13 is caused to slide along the axial aperture 30a as a guide, the disc 27 abuts against the E-ring 26 to open the control valve 7. While on the other hand, when the control member 13 is caused to rotate slidingly along the circumferential aperture 30b as the guide, the flow rate control member 18 rotates together with the control member 13 integrally to perform the flow rate control.

Further, as shown in FIG. 6 and FIG. 7, the corrugating top end of a positioning plate 33 disposed at the inner surface of the upper half top end member 12a is protruded to the side edge on the base end of the circumferential aperture 30b, so that the head 29a of the guide screw 29 is engaged to any one of the bottoms of the corrugating portion for positioning upon flow rate control. The positioning plate 33 is formed with an aperture 35 for inserting a boss 34 disposed to the upper half end member 12a. The positioning plate 33 is secured together with the upper half top end member 12a to the valve control holder 8 by means of the set screw 10a as shown in FIG. 3.

While on the other hand, the top end of the valve body 22 is slidably inserted axially to the base end of a gas mixture generator 36, which is held securely between both of the top end members 12a and 12b as shown in FIG. 3. The valve body 22 is sealed to the gas mixture generator 36 by means of an O-ring 37. Further, two ring plates 38 and 39 and a return spring 40 are respectively put between the O-ring 37 and the E-ring 26 as shown in FIG. 3, and the valve body 22 is normally urged resiliently toward the base end by the return spring 40.

As shown in FIG. 3, the gas mixture generator 36 comprises a gas mixture generating member 41 and a base end member 43 screw-coupled to the base end of the gas mixture generating member 41 in a gas tight manner by way of an O-ring 42. To the inside of the gas mixture generating member 41, are incorporated a nozzle plate 44 having a nozzle aperture of an accurate circular shape sized from 50 to 100 μm and, preferably, from 80 to 90 μm, a cylindrical retainer 45 for retaining the nozzle plate 44 and a filter 46, for example, made of a porous sintered alloy or the like with about 10 μm pore size, which is inserted and fixed to the inside of the retainer 45.

Further, as shown in FIG. 1 through FIG. 3, at the exit of the nozzle plate 44 of the gas mixture generating member 41, is perforated an air introduction aperture 47 for attracting external air by the ejector action of the liquefied gas jetted out from the nozzle plate 44 to form a gas mixture. At the top end of the gas mixture generating member 41, the combustion mechanism 5 are screw-coupled and the mounting mechanism 3 is mounted axially slidably and circumferentially rotatably with the combustion mechanism 5 being screw-coupled as above.

As shown FIG. 3, a plurality of ring grooves 48 are formed to the inner surface of both of the top end members 12a, 12b that hold therebetween the gas mixture generating member 41 so that the conduction of heat from the gas mixture generating member 41 to the top end members 12a and 12b is restricted. Stoppers 49 are circumferentially and discretely formed to the outer surface of both of the top end members 12a and 12b for restricting the position of the cap 6 mounted to the grip 1 as shown in FIG. 1 through FIG. 3, so that the gas pressure if resulted within the cap 6 may be escaped through the gap between each of the discontinuous stoppers 49.

Figure 8:
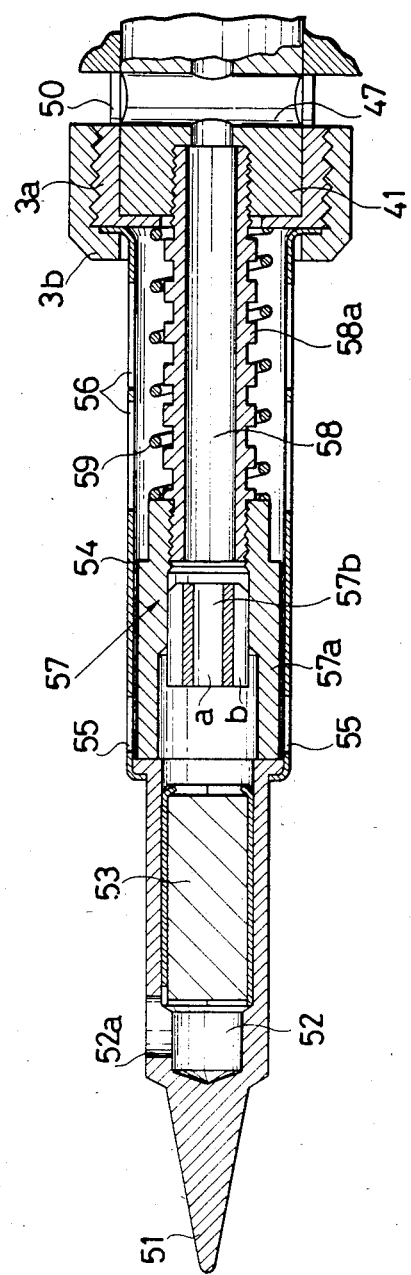
FIG. 8 is a cross sectional view showing the details of the iron tip and the heating member.

While on the other hand, the mounting mechanism 3 attached at the top end of the gas mixture generating member 41 comprises, as shown in FIG. 3 and FIG. 8, a generally cylindrical main body 3a and a mounting nut 3b screw-coupled over the top end of the main body 3a, in which U-shaped recesses 50 corresponding to the air introduction apertures 47 are formed at two positions on the circumferential surface at the base end of the main body 3a. The base end of the iron tip member 4 is held between the main body 3a and the mounting nut 3b as shown in FIG. 8.

Also as shown in FIG. 8, the iron tip member 4 comprises a contact type iron tip 51 having at the base end thereof a combustion chamber 52 that incorporates therein a combustion catalyst 53 and has an exhaust aperture 52a to the circumferential surface at the top end thereof, and a support pipe 54 such as made of stainless steel which is integrally connected at the top end thereof to the base end of the combustion chamber 52, for example, by caulking. The base end of the support pipe 54 is put between the main body 3a and the mounting nut 3b of the mounting mechanism 3. Further, as shown in FIG. 1 and FIG. 8, the support pipe 54 is formed with an ignition port 55 to the outer circumferential surface at the top end and a heat dissipation port 56 to the outer circumferential surface at the base end thereof respectively.

While on the other hand, the combustion mechanism 5 disposed within the support pipe 54 includes, as shown in FIG. 8, a connection pipe 58 that connects a fire block 57 at the top end with the gas mixture generating member 41 and has heat dissipation fins 58a formed at the circumferential surface thereof. A spring 59 is disposed around the circumferential surface of the connection pipe 58 for normally urging the mounting mechanism 3 and the iron tip member 4 integral therewith resiliently toward the base end, whereby the top end of the fire nozzle block 57 and the base end of the combustion chamber 52 are always in close contact with each other.

As shown in FIG. 8, the fire nozzle block 57 comprises a cylindrical fire nozzle member 57a and a fire nozzle 57b disposed within the fire nozzle member 57a, in which the fire nozzle 57b has a central aperture a and a gear-like channel b formed at the outer circumference thereof.

The combustion mechanism 5 constituted as described above can be used as a blow lamp (torch lamp) by loosening the mounting nut 3b of the mounting mechanism 3 and detaching the iron tip member 4 as shown in FIG. 2, or can be used as a flame heating device by rotating the main body 3a of the mounting mechanism 3 around the axis to close the air introducing apertures 47 while detaching the iron tip member 4.

OPERATION OF THE SOLDERING IRON

The operation of the soldering iron as one embodiment according to this invention will be described.

Upon use, the control member 13 is caused to slide toward the top end of the grip 1. Then, the actuator 25 integrated with the control member 13 and the disc 27 situated at the top end slide along the axial hole 30a of the guide hole 30 as the guide against the resiliency of the spring 28. Then, after the disc 27 has abutted against the E-ring 26 mounted to the valve body 22 of the control valve 7, the valve body 22 is also caused to slide toward the top end against the resiliency of the return spring 40. At the position where the head 29a of the guide screw 29 integrated with the actuator 25 displaces to the top end of the axial hole 30a, the control valve 7 is fully opened. In this state, since the flow rate control member 18 is set to a minimum flow rate discharge state, no or little liquefied gas is discharged from the inside of the gas reservoir to the top end of the valve body 22.

Then, when the control member 13 is rotated circumferentially along the circumferential aperture 30b as the guide, since the actuator 25 and the flow rate control member 18 is integrated in the circumferential movement, the flow rate control member 18 is rotated in the direction of increasing the gas discharge flow rate and an amount of gas is jetted out in proportion to the rotational amount is jetted out from the top end of the valve body 22. In this case, the head 29a of the guide screw 29 situated in the circumferential aperture 30b contacts the corrugating portion at the top end of the positioning plate 38 as shown in FIG. 6. When the rotation of the control member 13 is stopped, the head 29a of the guide screw 29 is stably held at that position in the bottom of the corrugating portion at the top end of the positioning plate 33. Since the actuator 25 is normally biased resiliently toward the base end by the spring 28, the head 29a is securely urged to the bottom and does not displace even if an incidental external force is applied more or less to the control member. Appropriate dials or indications (not illustrated) may be disposed at the portion where both of the top end members 12a, 12b and the control member 13 are opposed to each other for facilitating and securing the gas flow rate control by the control valve 7.

In this way, combustion has discharged from the top end of the valve body 22 of the control valve 7 is jetted out through the filter 46 from the nozzle plate 44, in which the jetted gas attracts external air by the ejector action thereof through the air introduction apertures 47 to form a gas mixture of the combustion gas and the air. The gas mixture is jetted from the fire nozzle block 57 at the top end of the combustion mechanism 5 to the combustion chamber 52.

When the mounting mechanism 3 is caused to slide toward the top end against the resiliency of the spring 59, the iron tip member 4 integrated with the mounting mechanism 3 also slides toward the top end, by which the base end of the combustion chamber 52 aparts from the top end of the fire nozzle block 57 to open the ignition ports 55. Then, when the gas mixture is ignited from the outer side by way of the ignition ports 55, flaming combustion takes place in the fire nozzle block 57 and the combustion catalyst 53 is heated by the flame to a temperature for the oxidizing reaction. Subsequently, the mounting mechanism 3 and the iron tip member 4 are returned to the initial state shown in FIG. 8 to close the ignition ports 55. Then, the flame is extinguished and the gas mixture is jetted out as it is from the fire nozzle block 57. The gas mixture passes through the inside of the combustion catalyst 53 and is discharged from the exhaust port 52a during which the gas is brought into sufficient contact with the heated catalyst to take place flameless complete combustion.

Thus, the control valve can be controlled to perform the flow rate control and the ON-OFF control only by a continuous step of procedures to one and identical control member 13.

Figure 9:
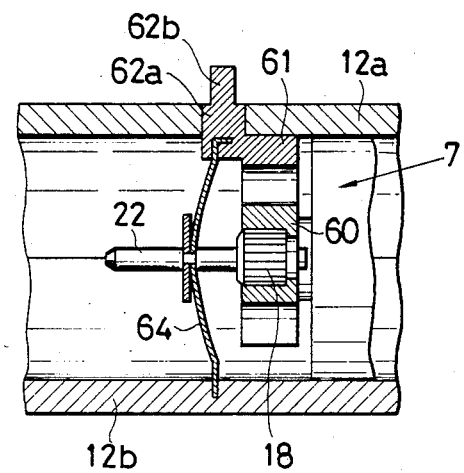
FIG. 9 through FIG. 11 are explanatory views of control valve operation mechanism in another embodiment according to this invention.
Figure 10:
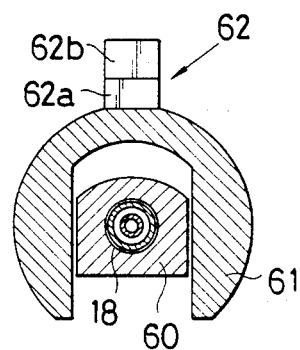
Figure 11:
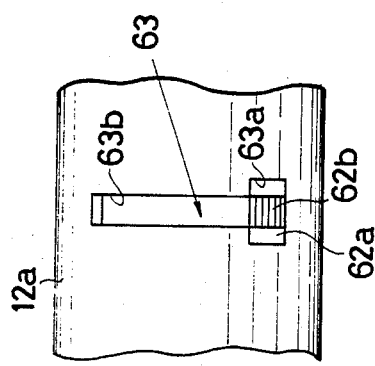

FIG. 9 through FIG. 11 show another embodiment according to this invention, in which the control mechanism for the control valve 7 has a modified structure.

As shown in FIG. 9 and FIG. 10, the flow rate control member 18 of the control valve 7 is disposed with a mounting member 60, to which a U-shaped actuator 61 is engaged movably in the vertical direction shown in the figure. Further, as shown in FIG. 9 through FIG. 11, the actuator 61 has an actuation button 62 comprising a larger size portion 62a at the base end and a smaller size portion 62b at the top end, and it is disposed to the upper half top end member 12a. The actuation button 62 is engaged into a guide hole 63 comprising a larger hole 63a in which the large size portion 62a can be engaged and a smaller hole 63b for the sliding guide of the smaller size portion 62b.

Further, as shown in FIG. 9, a leaf spring 64 is engaged at its intermediate portion to the valve body 22 of the control valve 7, secured at its lower end of the lower half top end member 12b and secured at its upper end to the actuator 61. In the constitution as described above, when the actuation button 62 is urged from the fully closed state shown in FIG. 9 through FIG. 11 toward the control valve 7, the leaf spring 64 is bent to urge the valve body 22 toward the top end. In this state, since the larger size portion 62a of the actuation button 62 has been got out of the larger hole 63a of the guide hole 63, the smaller portion 62b is caused to slide along the smaller hole 63b. Then, the flow rate control member 18 is rotated by way of the actuator 61 and the mounting member 60 to control the gas flow rate. In this case, if the urging force to the actuation bottom 62 is released subsequently, the control valve 7 does not close again, since the larger portion 62a is latched to the inner circumferential surface of the smaller hole 63b.

In this way, the flow rate control and the valve ON-OFF control can be performed only by a continuous step of procedures to the actuation button 62 also in this structure.

Figure 12:
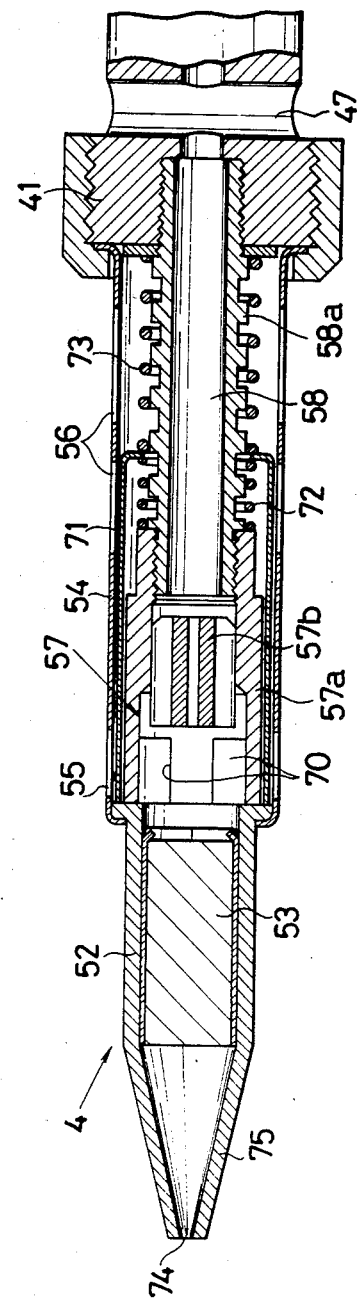
FIG. 12 is a view, corresponding to FIG. 8, of a further embodiment according to this invention.

FIG. 12 shows a still further embodiment according to this invention, in which the communication between the ignition ports 70 formed to the fire nozzle 57a of the fire nozzle block 57 and the ignition ports 55 of the support pipe 54 can be interrupted by a cylindrical shutter member 71 made of heat resistant and transparent material disposed between them. The shutter member 71 is constituted with a spring member 73 made of such a shape memory alloy that is usually opened by the spring 72 and expands by the heat from the connection pipe 58 after the ignition.

Since it is no more necessary to slide the iron tip member 4 in the embodiment shown in FIG. 12, the base end of the support pipe 54 is directly connected to the gas mixture generating member 41. At the top end of the combustion chamber 52, is disposed a hot blow discharging cylinder 75 of a so-called non-contact type iron tip, which discharges the combustion exhaust as a hot blow from the hot blow discharge port 74 at the top end and effecting soldering, flame heat treatment, etc by the hot blow.

In this structure, the same effect as that obtained by the sliding of the iron tip member 4 can be obtained without such a sliding mechanism.

In the case shown in FIG. 12, the spring 72 may be omitted and the spring 73 is constituted with an ordinary spring for normally closing by its resiliency the shutter member 71, which may forcively be opened by gripping the pin or the like disposed to the shutter member 71.

As described above, since this invention employs a control valve that controls the gas flow rate by the rotating operation to the flow rate control member, as well as discharges the gas under flow rate control from the top end of the valve body when it is rendered open by causing the cylindrical valve body the top end of which projects from the flow rate control member to slide toward the top end against the resiliency of the spring, there is no danger of damaging the valve or clogging the nozzle with metal powder as after experienced in the conventional middle valve.

Particularly, since the control valve is operated by the control valve operating mechanism, the valve ON-OFF control and the flow rate control can be performed with a continuous step of procedures to extremely facilitate the thermal power control.

What is claimed is:

1. A heating apparatus using liquefied gas comprising:
   a control valve including,
      means including a gas flow rate control member, rotatable around its longitudinal axis to control the rate of gas flow,
      a cylindrical valve body having first and second ends, said first end being projected from said flow rate control member, said valve body discharging gas, said discharging gas being subject to control by said flow rate control means when said valve body is caused to slide toward said first end, said valve body interrupting the discharge of the gas when said valve body is caused to slide toward said second end, and a spring attached to said valve body for urging said valve body resiliently toward said second end, a gas reservoir for supplying gas to said control valve; means for generating a gas mixture including, a restriction member for receiving and then jetting out the gas discharged from said first end of said valve body, a gas mixture generating member having a gas aperture through which is introduced, the gas jetted out from said restriction member, and means defining an air introduction aperture perforated through the circumferential wall of said gas mixture generating member for introducing external air by the ejector effect of the gas jetted out from said restriction member and generating a gas mixture of the gas and the air in said gas mixture generating member;

a combustion section for the combustion of said gas mixture jetted out from said means for generating a gas mixture; and a means for operating said control valve mounted to said control valve including, an actuation member for causing said valve body to slide toward said first end of said valve body by movement toward said first end in combination with movement along the circumferential direction relative to said control valve, and causes said flow rate control means to rotate when said actuating member is rotated around the axis of said control valve, and said flow rate control means includes a second control member, a connecting member for integrally connecting said actuating member with said second control member.

2. The heating apparatus using liquefied gas as defined in claim 1, including means for closing said air introduction aperture.

3. The heating apparatus using liquefied gas as defined in claim 1, wherein said combustion section includes, a combustion chamber, a combustion catalyst in said combustion chamber, and a contact type heating iron having a tip, in which said iron tip is heated by the combustion heat obtained by the flameless complete combustion of the gas mixture by said combustion catalyst in said combustion chamber.

4. The heating apparatus using liquefied gas as defined in claim 1, wherein said combustion section includes, a combustion chamber having a first end with an opening, a combustion catalyst in said combustion chamber, and a non-contact type heating iron, in which the combustion exhaust obtained by the flameless complete combustion of the gas mixture by said combustion catalyst in the combustion chamber is discharged as a hot gas from said opening at said first end thereof.

5. The heating apparatus using liquefied gas as defined in claim 1, wherein said combustion section includes a fire nozzle.

6. The heating apparatus using liquefied gas as defined in claim 1, wherein said actuation member means is mounted to said flow rate control member and is axially slidable and circumferentially secured relative to said flow rate control means and means for interlocking said actuation member and said valve body upon abutment of said actuation member by the sliding movement of said actuation member toward said first end of said valve body.

7. The heating apparatus using liquefied gas as defined in claim 1, wherein said control valve operating means comprises an actuation member which is mounted to said flow rate control means and which is angularly movable and circumferentially secured integrally to said flow rate control means, and a leaf spring which causes the valve body to slide toward the first end of said valve body by the angular movement of the actuation member.

* * * * *